Oct. 11, 1932.  W. I. CLEMENTS  1,882,485
AUXILIARY SEAT AND BACK REST
Filed April 28, 1931   3 Sheets-Sheet 1
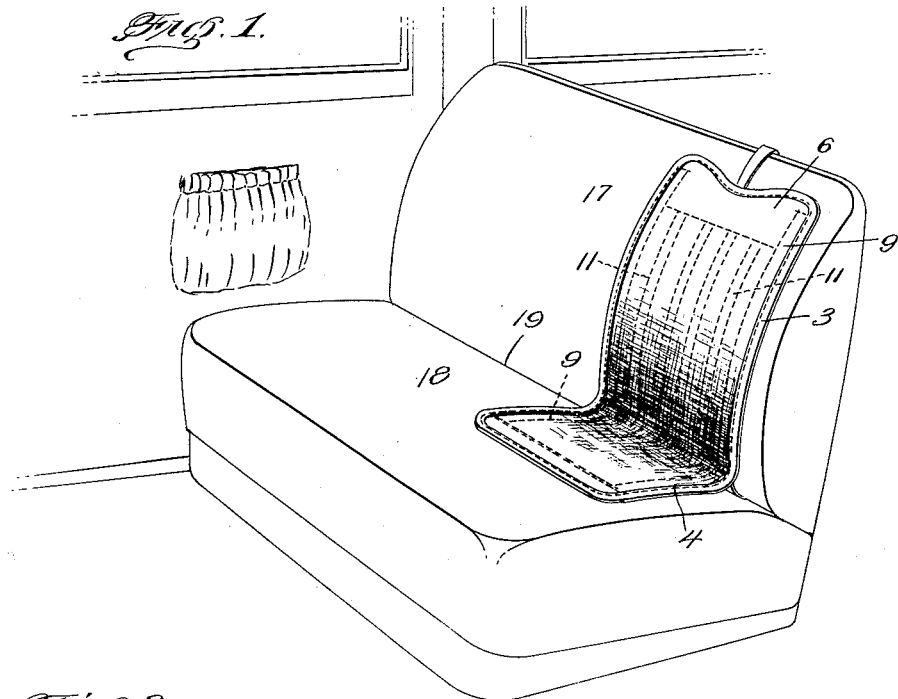
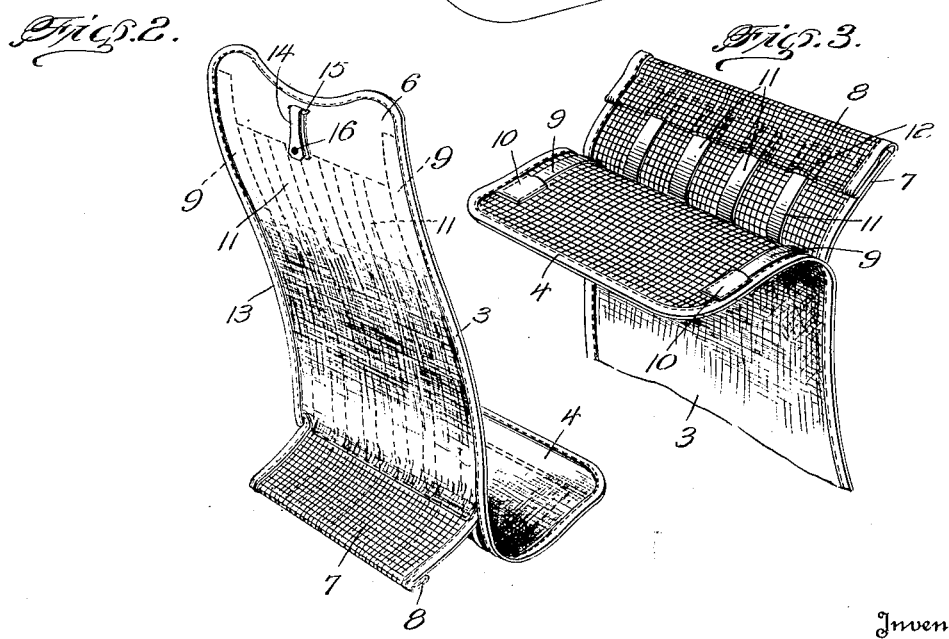
Inventor
Wellington I. Clements.
By William W. Deane
his Attorney

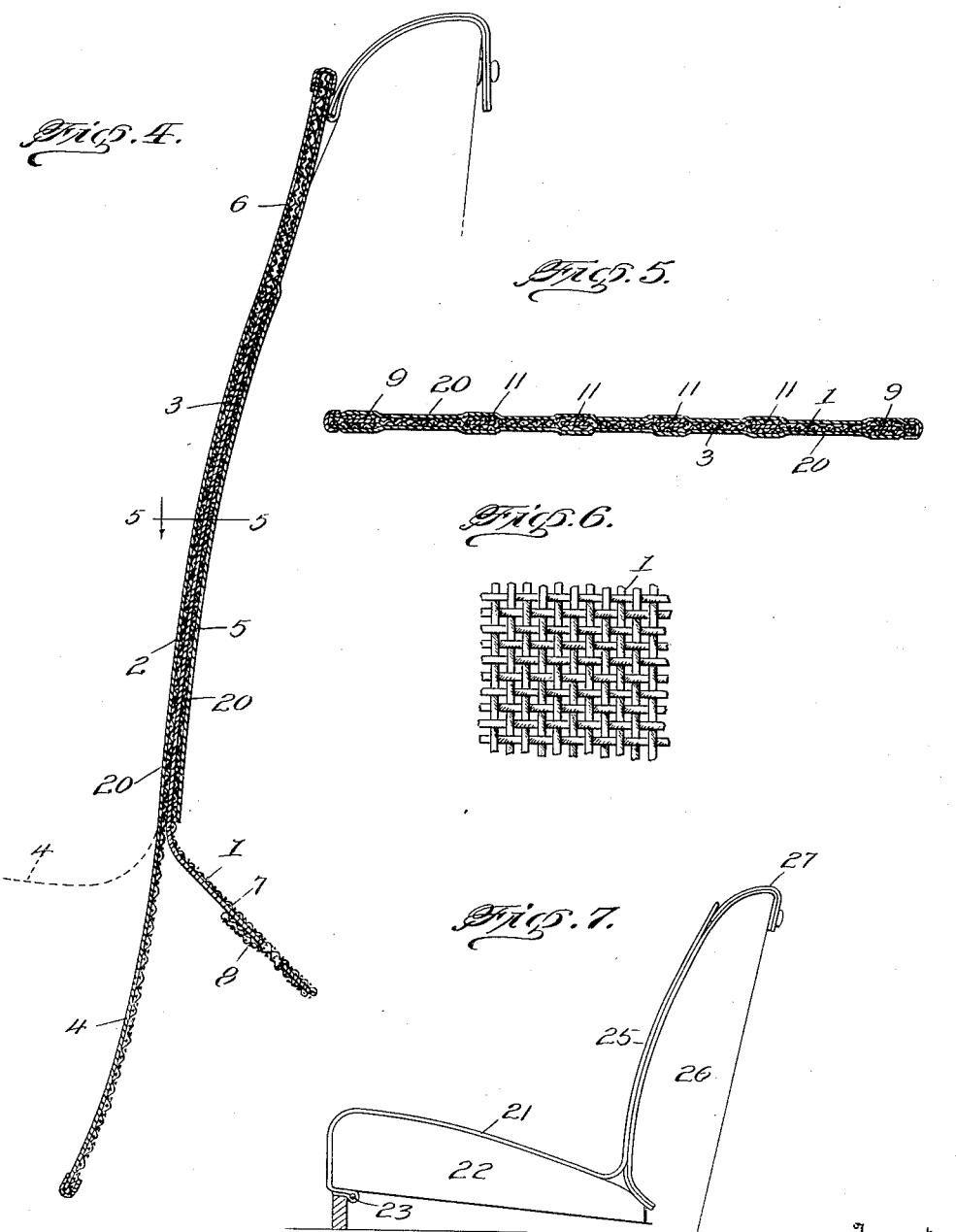

Oct. 11, 1932. W. I. CLEMENTS 1,882,485
AUXILIARY SEAT AND BACK REST
Filed April 28, 1931 3 Sheets-Sheet 3
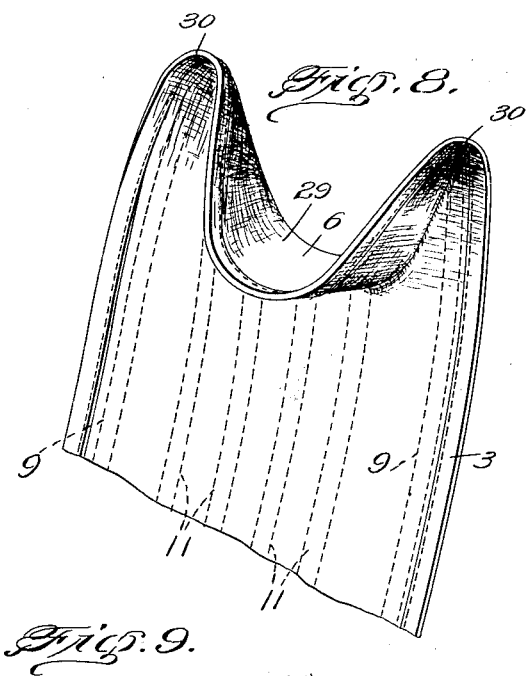
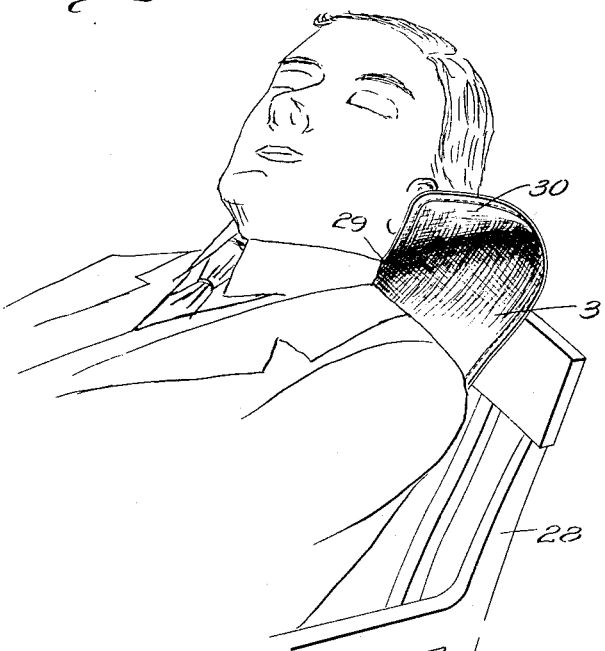
Inventor
Wellington I. Clements
By William B. Deane
his Attorney Patented Oct. 11, 1932

1,882,485

UNITED STATES PATENT OFFICE

WELLINGTON I. CLEMENTS, OF NORFOLK, VIRGINIA

AUXILIARY SEAT AND BACK REST

Application filed April 28, 1931. Serial No. 533,525.

This invention is directed to an auxiliary seat and back rest designed for use in connection with seats of various kinds, and particularly with automobile seats, and constructed with a view to promoting the ease and comfort of the occupant.

The primary object of the present invention is the provision of an auxiliary seat and back which may be readily and conveniently applied, and which, when in place, tends to the elimination of friction between the auxiliary seat back and the part to which it is applied and to insure the weight of the occupant being distributed over a greater spring area of the seat proper, to thereby insure less tension on any particular spring within that area.

A further object is the provision of a seat and back rest constructed of appropriate fabric and including a plurality of spring strips which extend longitudinally of the back and throughout a portion of the width of the seat, these springs serving to distribute the weight of the occupant over a greater area of the part on which the seat and back rests, with the result that there is a disribution of the weight strain over a greater area, thereby reducing strain on any particular part.

A further object is the provision of a seat and back rest provided with a depending anchoring flap of particular utility in connection with the use of the improvement with automobile seats, in that the flap is positioned to be inserted between the automobile seat and back at their juncture, thereby materially preventing lateral movement of the back rest of the improvement and serving to assist in maintaining the improved seat and back rest in proper operative position at all times.

A further object of the invention is the provision of a seat and back rest in which one or both faces of the back are to be provided with material presenting a smooth, glossy surface to thereby avoid friction between the back rest and the back of the seat to which it is applied or between the back rest of the improvement and the back of the occupant.

A further object of the invention is the utilization of an extension of the back rest to form a support for the head of the user, when desired, the construction of the back rest permitting a portion of the extension or upper end to appropriately flex under the weight of the head of the user, while maintaining the remaining outstanding portions more or less rigid, whereby when in use under such conditions, the relatively rigid portions form protective coverings for the ears of the user, thus tending to deaded external sounds and their effect on the user, with the obvious advantage.

The invention is illustrated in the accompanying drawings, wherein:—

Figure 1 is a perspective view showing the improved seat and back rest applied to an automobile seat.

Figure 2 is a perspective view of the seat and back rest viewed from the rear.

Figure 3 is a broken perspective view of the seat and back rest inverted.

Figure 4 is a longitudinal section through the improved seat and back rest.

Figure 5 is a section on the line 5—5 of Figure 4.

Figure 6 is an enlarged detail showing the material employed in the seat and back rest.

Figure 7 is a diagrammatic view showing a modification.

Figure 8 is a perspective view of the upper portion of the back rest showing the extension in the shape assumed when such extension is used as a head rest.

Figure 9 is a perspective view illustrating the ear-protective function of the relatively rigid portions of the head rest.

The improved seat and back rest is constructed of a suitable length of appropriate material, it being preferred that open mesh material, such as indicated at 1 in Figure 6, be employed in order to facilitate the free passage of air therethrough for obvious ventilation purposes. The construction includes a length 2 of such material which will provide a back portion 3 and a seat portion 4. There is no attempt to form any line of division between the seat and back portion, that is, any predetermined line of fold which clearly defines the back and seat portions of the structure. On the contrary, the back and seat portions are formed of an unbroken length of material, it being understood, of course, that when applied, as will later appear, the greater length of such material forms the back rest 3, while the remaining length forms the seat 4.

The back 3 is preferably of double thickness, that is, there is secured to the back proper an additional layer of material 5, the upper end of which terminates some distance below the back proper to thereby leave a portion of such back proper at the upper end to form what will be hereinafter termed the back extension, indicated at 6. The additional thickness of material 5 extends lengthwise the back to a point defining the line between the back and seat, from which line the additional layer 5 extends as a free section to form an anchorage portion 7, the extreme end of which is preferably folded back upon itself, as at 8, for reinforcing purposes.

The improved back rest and seat are provided with stiffening, reinforcing means which serve to add to the resiliency of the device as a support and at the same time tend to distribute the weight of the occupant over substantially the full area of such back and seat rest. These reinforcing elements are in the shape of spring strips 9 arranged immediately adjacent the side edges of the spring section 2, the lower ends of which spring strips are removably seated in pockets 10 formed on the relatively inner, that is, lower surfaces of the seat 4 a short distance from the free end edge of such seat, the upper ends of the strips 9 terminating immediately adjacent the extreme upper end edge of the extension 6. The respective ends of the spring strips are removably seated in pocket formations, as indicated at 10, so that they may be conveniently removed and applied when necessary or desirable.

Intermediate the main spring strips 9, which, as understood, extend throughout the full length of the back portion 3 and seat portion 4, there are provided additional reinforcing spring strips 11 which are inherently curved near their lower ends and seated at their lower ends in pockets 12 formed between the folds at the free edge of the anchorage section 7. These spring strips 11 extend lengthwise the anchorage section and throughout the length of the extra layer 5 of the back section 3, terminating at their upper ends at the lower end of the extension 6. As stated, these auxiliary strips 11 are inherently curved so that the anchorage section is normally projected away from the main section, as clearly indicated in Figures 2, 3 and 4. The spring strips 11 are arranged in appropriate number between the main strips 9 and are preferably equally spaced relative to each other and relative to the main strips 9, as clearly indicated in Figure 3 of the drawings. Four of such auxiliary spring strips are here indicated, though it is obvious that any appropriate number may be used.

The material of the back and seat rest has an edge binding 13 of any appropriate material and the rear upper portion of the extension 6 is preferably provided with a fastening means in the form of a rubber strip 14 passing through a loop 15 on the rear of the extension and terminally formed with openings 16 which may be secured over a button or other projection on the rear of the automobile seat, as indicated in Figure 4.

The application of the back and seat rest to an automobile seat is indicated in Figure 1 of the drawings. The device is applied so that the back 3 rests against the back 17 of the automobile, while the seat 4 overlies the seat 18 of the automobile. The anchorage section 5 is inserted and forced between the back and seat at the juncture line 19, the spring strips 11 facilitating this application. The fastener 14 is applied as indicated, and in this position it is to be noted that the anchorage section prevents tilting, lateral play or any appreciable displacement of the seat and back by reason of the fact that the anchorage section is held in position frictionally and the spring strips utilized in the formation of the device serve to retain more or less rigidity against collapse.

The spring strips 9 will, in this position of the improvement, extend longitudinally of the back and curve outwardly onto the seat, this being clearly shown in dotted lines in Figure 1. Thus the weight of the person against the back will, through the medium of the spring strips, be distributed over a relatively large area of such automobile seat back and thus cause such weight to be taken up by a greater number of springs than usual, with the effect to lessen the tension on any particular spring or springs and thus assist in maintaining a normal resiliency of the automobile seat back, notwithstanding continued use. The auxiliary spring strips 11 extend lengthwise the back and throughout the anchorage section. This also serves to maintain the back in proper extended relation, and further provides a means for distributing the weight of the occupant.

In the use of the device, particularly with automobiles, it is important, for the purpose of obviating wear and creating resistance to the free movement of the occupant, that friction be avoided as far as possible either between the device and the occupant or between the device and the automobile seat back. For this purpose, I prefer to cover either the front or rear surface of the back with a section of smooth, glossy material, indicated at 20 in Figure 4, the nature of which permits free, substantially frictionless movement either between the back of the device and the seat back of the automobile or between the device and the clothing of the occupant. Obviously, of course, both sides of the device may be covered with such material, under either of which circumstances there is a material reduction in friction tending to permit comparatively free sliding movement of the occupant in the involuntary body adjustments and movements incident to the use of the seat.

If desired, as indicated in Figure 7, the seat 4 may be extended so as to completely overlie the automobile seat throughout the width of the device. That is to say, the seat sections of the improvement, here indicated at 21, may have a length greater than the width of the automobile seat, here indicated at 22, with such length to permit the seat 21 to extend downwardly in front of the automobile seat beneath the bottom, as at 23, to be appropriately held between the automobile seat and the support therefor. In this instance, the back of the improvement, there indicated at 25, extends throughout or substantially throughout the full height of the automobile seat back 26 and is secured by the previously described fastener 27 in the usual way.

As previously described, the main spring sections 9 extend throughout the full length of the back rest of the improvement, while the auxiliary spring strips 11 do not extend throughout the extension 6. Thus that portion of the extension intermediate the main spring strips 9 is more or less flexible, and in the use of the auxiliary seat and back rest in connection with chairs or the like, as indicated at 28, the extension 6 may be used to support the head of the occupant, being sufficiently flexible to conform to the head throughout that portion intermediate the main spring strips 9. That is to say, under the weight of the head of the occupant, the intermediate portion of the extension forms a relatively broad, rounded support 29 to receive the head and neck of the occupant. The extreme side edges of the extension, however, do not partake of this bending movement and remain rigid so that the head of the occupant is resting in the formed portion 29, while the main springs 9 serve to provide upstanding sections 30 on each side of this depressed head-receiving portion 29. These portions 30 will naturally position themselves to overlie the ears of the occupant so that when the structure is in use in this respect, the head and neck of the occupant are supported in a convenient, comfortable position, while the extensions 30 provide what may be termed flaps to more or less closely bear on the ears of the occupant to deaden any external sounds. Thus the extension is capable at any time of providing a convenient head support and rest, and in its mere adaptation to this use, ear-protective portions will be automatically formed or arranged for the purpose designed.

Of course, the improved seat and back rest may be constructed of any appropriate material in any desired width, the requirements being, however, that the device possess the capability of adjusting itself or accommodating itself to its use through the medium of the spring strips, and that such spring strips be terminally seated in pockets formed in the fabric portions to facilitate removal and replacement of the strips in a simple and convenient manner. The device as a whole, while designed more particularly for automobile use, is nevertheless obviously capable, as indicated for example in Figure 9, of being used with any chair or formed seat, as the back and seat length of the device will readily accommodate themselves to the particular article to which they are applied, while the anchorage section, by reason of its extension in opposition to the seat portion 4, will insure against any collapse or lateral play of the back rest.

I claim:—

1. A seat and back rest constructed of fabric and formed to provide an offset anchorage section, and spring strips extending lengthwise the seat and back, certain of the springs extending into and normally positioning the anchorage section.

2. A seat and back rest constructed of fabric an additional section secured to the back and seat rest and having a free portion defining an offset anchorage section, spring strips extending lengthwise the seat and back, and auxiliary springs extending lengthwise the back and throughout the anchorage section.

3. A seat and back rest constructed of fabric an independent section secured thereto and having a free portion providing an anchorage section, spring strips extending lengthwise the seat and back, and auxiliary springs extending lengthwise the back and throughout the anchorage section, said latter springs being laterally curved to provide an angular portion to engage the anchorage section to predetermine the normal direction of the anchorage section.

4. A combined seat and back rest including a fabric length providing back and seat portions, a second fabric length secured to the back portion and extending below the latter as an independent anchorage section, spring strips secured adjacent the edges of the fabric and extending substantially throughout the length of the back and seat, and auxiliary spring strips extending substantially throughout the length of the second fabric section, said latter spring strips having curved terminals to seat in the anchorage section to normally project the anchorage section at an angle to the seat.

5. A combined seat and back rest including a length of fabric forming a seat and back, springs arranged adjacent the edges of such fabric and extending substantially throughout the length thereof, pockets formed in the fabric to removably receive the ends of the springs, and an anchorage section secured to the rear of the back, said anchorage section being stiffened, with the stiffening means extending throughout a portion of the length of the back.

6. A combined seat and back rest including a main length of material forming the seat and back, means for stiffening the side edges of such material to accommodate the portion of the upper end of the back intermediate the stiffening means for flexing under the head of the occupant, the stiffening means serving to maintain projections on each side of the flexed portion to form ear protectors.

7. A combined seat and back comprising an unbroken length of material forming a seat and back, a second length of material secured to the back below the upper edge of the latter, said second length of material being projected as a free anchorage flap adjacent the juncture of the seat and back, stiffening means for the seat and back capable of flexing in the application of the device, and spring strips extending throughout the length of the anchorage section and curved in that portion engaging the anchorage section relative to the remaining lengths of the springs, the curved portions of the springs serving to deflect the free portion of the anchorage section with respect to the back.

8. A combined seat and back comprising an unbroken length of material forming a seat and back, a second length of material secured to the back below the upper edge of the latter, said second length of material being projected as a free anchorage flap adjacent the juncture of the seat and back, stiffening means for the seat and back capable of flexing in the application of the device, spring strips extending throughout the length of the anchorage section and curved in that portion engaging the anchorage section relative to the remaining lengths of the springs, the curved portions of the springs serving to deflect the free portion of the anchorage section with respect to the back, and a frictionless facing extending throughout the length of the back on both the front and rear surfaces.

In testimony whereof I affix my signature.

WELLINGTON I. CLEMENTS.